D. M. COOK.
Evaporating Pan.
No. 37,735.                                    Patented Feb. 24, 1863.
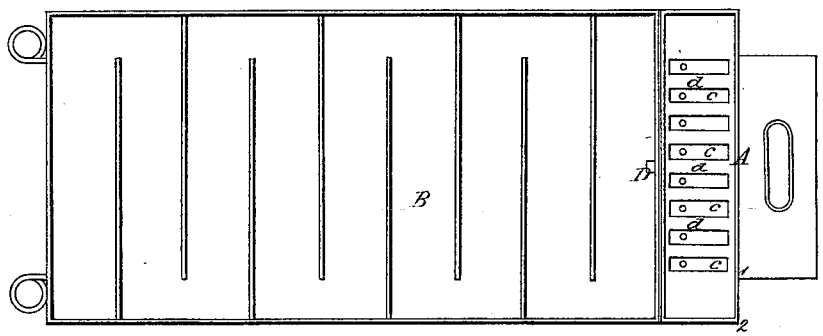
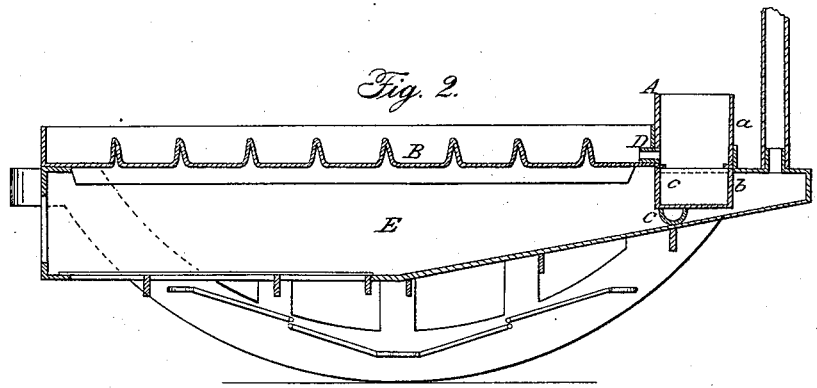
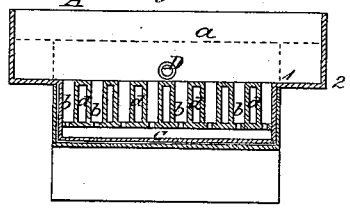
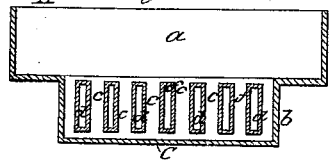
Witnesses:                                     Inventor:

UNITED STATES PATENT OFFICE.

D. M. COOK, OF MANSFIELD, OHIO.

IMPROVED CELLULAR OR TUBULAR BOILER FOR EVAPORATING-PANS.

Specification forming part of Letters Patent No. 37,735, dated February 24, 1863.

*To all whom it may concern:*

Be it known that I, D. M. COOK, of Mansfield, in the county of Richland and State of Ohio, have invented a new and useful Cellular or Tubular Boiler, adapted for use in connection with shallow evaporating-pans; and I do hereby declare that the following is a full, clear, and exact description of the same, reference being had to the accompanying drawings, forming part of this specification, in which—

Figure 1 is a top view of my invention as used with a shallow evaporating-pan. Fig. 2 is a longitudinal section of the same. Fig. 3 is a cellular boiler in section. Fig. 4 is a modification of the same in section.

Similar letters of reference in the several figures indicate corresponding parts.

My invention relates to a tubular or cellular boiler adapted to pans which are known as "shallow evaporators."

It is now generally understood that sugar-juices obtained from the sorghum and other kindred plants can be evaporated to the best advantage in shallow pans, which allow a circulation of the juices, but arrest the scum and impurities. In deep boiling the bubbles are compressed by the weight of juice above them, and are forced up in small currents, thus 

There is consequently a heavy body of juice between these currents, which keeps down the temperature of the metal forming the deep pans. In boiling or evaporating shallow bodies, where there is no compression by the weight of juice above, the bubbles assume this form . The whole pan being covered with these broad bubbles, there is but a thin film of juice in contact with the pan. The metal therefore is raised to a much higher degree of heat, and that too in safety, because the steam in the lower strata of bubbles is a good preventative of burning; and, beside this, the use of a running stream through the pan keeps the body of juice in circulation. This greater heat, while securing more rapid evaporation, gives more active motion to the bubbles in their course from the heated to the cool parts of the pan. It also causes a continued expansion of the gases in the bubbles, and a consequent thinning of the film thereof takes place, and thus the particles of albuminous and other feculent matters with which it is charged are brought more promptly and efficiently into contact with that greatest of all defecating agents, heat. These fly from all parts of the film to the top of the bubble, which, thus freighted, rises and rides to the outer and cooler sides of the pan, and deposits its load at the hand of the operator. In deep boiling, the steam being compressed by the weight of juice above, it is forced up in currents of small bubbles with thicker film, and leaves a much larger mass of juice to be acted upon by a less degree of heat. The feculencies do not rise so promptly nor to such an extent as in shallow boiling; and the feculencies which do rise are, by these clashing currents tumbling against each other, forced down again into the juice, the purity of which is thereby impaired and its defecation rendered less perfect. In the use of deep boilers the whole mass to be reduced to a given consistency must be retained much longer over the fire. All the particles in a gallon of juice must remain over the fire just four times as long as they would if only a quart at once were subjected to the action of heat. As a consequence, the product is very much darker in color and inferior in quality. In shallow bodies the feculencies are more quickly thrown out, and it is universally admitted that the more quickly defecation is effected the purer will be the sirup.

The object of my invention is to enable the sirup and sugar maker at his option to avail himself of the advantages due to the use of shallow evaporators and deep cellular boilers in such manner that the juice may be quickly brought up to the boiling-point in a body or a series of narrow bodies, and then passed at once into a shallow evaporator for defecation and evaporation, and, while this is so, effect a saving of the fuel expended in evaporating a given quantity of juice.

My invention may be stated as consisting in a deep cellular or tubular boiler for application to one end of a shallow evaporating-pan; also in a combination of such a boiler with such a pan and a furnace; likewise in constructing a cellular or tubular boiler with cooling or extended sides.

To enable others skilled in the art to make and use my invention, I will now describe the same.

A represents the cellular boiler, consisting of an undivided upper compartment, $a$, and a divided lower compartment, $b$. The upper compartment is longer in a transverse direction with respect to the furnace on which it is used than the lower compartment. This is to obtain cooling sides outside of the range of the fire, as indicated between 1 and 2. The division-cells $c\ c$ and the flame-flues $d\ d$ are formed by crimping the metal forming the bottom of the boiler, and then closing up the ends of every alternate crimp or fold, as represented in the drawings. In order to secure a transverse circulation of the juice, each of the cells $c\ c$ is perforated at its bottom, and a gutter or pipe, C, is placed under the cells and united to the same, as shown. The ends of this pipe are closed.

In the front part of the upper compartment, $a$, of the boiler a tube, D, for leading into a shallow evaporating-pan, is provided. The tubular boiler produces substantially the same results with the cellular boiler; but it is formed in a different way therefrom, the division-cells $c\ c$ and the flame-flues $d\ d$ being obtained by inserting flat tubes $f\ f$ through the sides of the lower compartment, $b$. With this construction the transverse circulation of the juice under the tubes is secured by leaving a small space, C, between the bottom of the boiler and the bottom of each tube.

The cells or tubes may be oblong, cylindrical, or many sided, or of any other shape; but for the purpose of securing the greatest extent of heating-surface consistent with economy of construction they are preferably oblong, as shown. These cells may also be constructed to run transversely or obliquely or parallel to the current of heated gases or steam used for evaporating the sugar-juices. The cellular or tubular portions may be formed of sheet or cast metal. Sheet metal is preferable.

The boilers described are adapted for being located in the throat of the chimney or furnace, as represented, and for being connected to that end of the shallow pan which is near said throat.

In the drawings I have shown one of my own shallow evaporating-pans with zigzag circulation-passage and transverse ledges, and the connection of the boiler is made to it by the tube D entering its end on nearly a level with the bottom of the pan. The pan B and boiler A are represented as arranged on my patented portable furnace E. I, however, do do not confine myself to any particular construction of shallow pan, nor to any particular construction of fire-furnace, as a shallow pan of any description adapted for rapidly evaporating sugar-juices, as also a furnace of any description adapted for heating the pan and boiler, may be adopted.

It will be evident that the cellular or tubular boiler brings the greatest amount of heating-surface into the smallest space, thus rendering more compact the size of the evaporator for a given capacity of evaporation, and insuring rapidity of evaporation. In cane-juice this is more especially desirable, as it effects a more complete coagulation of the impurities, and crystallization is correspondingly more perfect. My boiler makes the pan itself boil faster with the same fuel, owing to the obstruction and reflection of heat by the cells in the throat of the furnace. The boiler itself is heated by the waste or surplus heat which usually passes off into the chimney after the pan has been acted upon by it. A further saving of this waste heat might be effected by forming cells and flues on the back of the boiler, as well as on the bottom. By having the upper part of the boiler extend beyond the range of the fire the albuminous or green matter contained in the juice will be deposited toward the sides of the boiler, and can be readily skimmed off; and for convenience of skimming, the ends of the boiler may be inclined; and to prevent boiling over at the sides and ends, the top edge of the front of the boiler may be depressed with a lip to conduct the overflow to the pan.

In using my invention the juice is introduced into the boiler and therefrom passes into the shallow pan.

The cellular or tubular boiler may also be used as a "finisher" by slightly elevating the pan above the cells, with a pipe connecting the two, in which case the stream of juice will be taken at the front end of the pan and the sirup drawn off by a faucet inserted through the side of the furnace into the end of the pipe C.

What I claim as my invention, and desire to secure by Letters Patent, is—

1. A cellular or tubular boiler, substantially as described, adapted for application to a shallow evaporating-pan, substantially as described, and for the purpose set forth.

2. The combination of a boiler with deep cells or tubes, a furnace, and a shallow evaporating-pan, substantially in the manner described.

3. Constructing the cellular or tubular boiler with cooling or extending sides, and also applying it to the throat of a furnace, substantially in the manner and for the purpose set forth.

Witness my hand in the matter of my application for patent on tubular and cellular boilers adapted for shallow evaporating-pans, this 22d day of January, 1863.

D. M. COOK.

Witnesses:
A. T. BATES,
W. H. BLYMYER.